(12) United States Patent
Lepretre et al.

(10) Patent No.: US 10,578,054 B2
(45) Date of Patent: Mar. 3, 2020

(54) STIFFENING OF THE CONNECTION BETWEEN FLAPS IN A NOZZLE OF VARIABLE CROSS SECTION

(71) Applicants: SAFRAN CERAMICS, Le Haillan (FR); SAFRAN AIRCRAFT ENGINES, Paris (FR)

(72) Inventors: Gilles Lepretre, Le Haillan (FR); Julien Tran, Le Haillan (FR)

(73) Assignees: SAFRAN CERAMICS, Le Haillan (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/300,396

(22) PCT Filed: May 12, 2017

(86) PCT No.: PCT/FR2017/051158
§ 371 (c)(1),
(2) Date: Nov. 9, 2018

(87) PCT Pub. No.: WO2017/194897
PCT Pub. Date: Nov. 16, 2017

(65) Prior Publication Data
US 2019/0226425 A1    Jul. 25, 2019

(30) Foreign Application Priority Data

May 12, 2016    (FR) ...................... 16 54251

(51) Int. Cl.
*F02K 1/12*     (2006.01)
*F02K 1/80*     (2006.01)

(52) U.S. Cl.
CPC .......... *F02K 1/1253* (2013.01); *F02K 1/1207* (2013.01); *F02K 1/80* (2013.01);
(Continued)

(58) Field of Classification Search
CPC ........ F02K 1/1253; F02K 1/1207; F02K 1/80; F05D 2220/323; F05D 2240/40; F05D 2240/90; F16H 21/60; F16H 21/00
(Continued)

(56) References Cited

U.S. PATENT DOCUMENTS 2,926,489 A    3/1960  Halford et al.
2009/0266912 A1 * 10/2009  Gukeisen ............... F02K 1/1253
                                                           239/265.33

FOREIGN PATENT DOCUMENTS

FR    2 732 408 A1    10/1996
GB      750307 A       6/1956
GB     2307721 A   *   6/1997    .............. F02K 1/12

OTHER PUBLICATIONS

International Search Report dated Jun. 28, 2017 in PCT/FR2017/051158 filed May 12, 2017.

* cited by examiner

*Primary Examiner* — Steven M Sutherland
*Assistant Examiner* — Alexandru A. Herescu
(74) *Attorney, Agent, or Firm* — Oblon, McClelland, Maier & Neustadt, L.L.P.

(57) ABSTRACT

A variable section nozzle includes an ejection casing and a plurality of internal flaps arranged in a ring downstream from the ejection casing. Each internal flap is connected to the ejection casing by a movable lever pivotally mounted to the downstream end of the ejection casing. Each lever is movable between a first position in which the internal flaps are in a high position and a second position in which the internal flaps are in a folded-down position. The nozzle includes a plurality of rigid movement transmission parts distributed circumferentially around the ejection casing. Each rigid movement transmission part is connected to two adjacent levers by connecting rods, and to a control actuator.

(Continued)

Each rigid movement transmission part can move in a direction corresponding to the axial direction of the nozzle under the action of the control actuator to move the adjacent levers between the first and second positions.

6 Claims, 6 Drawing Sheets

(52) U.S. Cl.
CPC .... *F05D 2220/323* (2013.01); *F05D 2240/40* (2013.01); *F05D 2240/90* (2013.01)

(58) Field of Classification Search
USPC .................................. 60/771; 74/579 R, 50
See application file for complete search history.

STIFFENING OF THE CONNECTION BETWEEN FLAPS IN A NOZZLE OF VARIABLE CROSS SECTION

BACKGROUND OF THE INVENTION

The invention relates to aeroengines fitted with a variable section nozzle, and more particularly to the connection that enables actuating movements to be transmitted to each flap.

Document U.S. Pat. No. 7,533,533 describes a variable section nozzle having a plurality of internal flaps or "hot flaps" channeling the primary or main air stream of the engine. The internal flaps are actuated by control levers so as to modify the profile of the primary stream from the turbine engine (i.e. the ejection section(s) depending on whether the nozzle is merely a converging nozzle or a converging and diverging nozzle).

In Document U.S. Pat. No. 7,533,533, only every other internal flap is controlled directly by an actuator that is connected to the control lever of the flaps. The flap adjacent to the flap fitted with an actuator is drivingly coupled by connection clevises that transmit a fraction of the force produced by the actuator to the coupled flap.

Although that solution enables the variable section nozzle to be made lighter in weight by minimizing the number of actuators in the nozzle, it leads to asymmetry in the mechanical loading of the nozzle. The levels of mechanical forces and the directions of those forces on the portions of the flap control levers fastened to the ejection casing of the nozzle differ depending on whether the levers are or are not fitted with an actuator. The levers without actuators are controlled in a manner that is less rigid than the control of the levers with actuators, which leads to an offset in the angular position for the coupled flaps. For this purpose, it is necessary to perform pre-loading on the coupled flaps in order to compensate for this offset.

This mechanical unbalance leads to a high level of static indeterminacy in the nozzle, to a linkage that is loaded tangentially, and to a high level of wear of the moving parts of the lever control devices.

Consequently, there exists a need to enable mechanical forces to be transmitted in balanced and synchronized manner to each flap of the nozzle, without significantly increasing the overall weight of the nozzle.

OBJECT AND SUMMARY OF THE INVENTION

To this end, the invention provides a variable section nozzle comprising an ejection casing and a plurality of internal flaps arranged in a ring downstream from the ejection casing, each internal flap being connected to the ejection casing by a movable lever pivotally mounted to the downstream end of the ejection casing, each lever being movable between a first position in which the flaps are in a high position and a second position in which the flaps are in a folded-down position, the nozzle further comprising a plurality of rigid movement transmission parts distributed circumferentially around the ejection casing, each rigid movement transmission part being connected respectively to two adjacent levers by first and second connecting rods, each rigid movement transmission part also being connected to a control actuator, each rigid movement transmission part being suitable for moving in a direction corresponding to the axial direction of the nozzle under the action of the control actuator to which it is connected in such a manner as to move the adjacent levers between the first and second positions; the nozzle being characterized in that each rigid movement transmission part is connected to a guide carriage slidably mounted in a respective slideway, each slideway being fastened on the ejection casing upstream from the levers in a direction corresponding to the axial direction of the nozzle, each slideway being in axial alignment with a control actuator, or in that each rigid movement transmission part is connected to two guide carriages each slidably mounted in a respective slideway, each slideway being fastened on the ejection casing upstream from each lever in a direction corresponding to the axial direction of the nozzle, the slideways being offset in the circumferential direction relative to each control actuator.

By means of the rigid movement transmission part, it is possible to stiffen the connection between two adjacent levers and to transmit a movement force from a single actuator to both of these levers in a manner that is balanced and synchronized. This improves the balancing of the forces transmitted to the flaps and also improves taking up of the forces to which the flaps might be subjected, but without increasing the number of actuators, thereby making it possible to conserve a satisfactory overall weight for the nozzle.

Also, since the rigid movement transmission parts are mechanically independent of one another, the flap control device as a whole presents good flexibility, which is advantageous, in particular during thermal expansions in the nozzle.

According to a particular characteristic, each rigid movement transmission part is connected to the first and second connecting rods by respective first and second hinged connections.

According to another particular characteristic, the first hinged connection comprises a first hinge block received in a recess present at a first end of the rigid movement transmission part, a first clevis connecting the first hinge block to the first connecting rod, circumferential clearance being present between the first hinge block and the edge of the recess that is on the outside in the circumferential direction of the nozzle. The second hinged connection comprises a second hinge block received in a recess present at a second end of the rigid movement transmission part, a second clevis connecting the second hinge block to the second connecting rod, circumferential clearance being present between the second hinge block and the edge of the recess that is on the outside in the circumferential direction of the nozzle.

This structure for the hinged connection compensates for tangential expansion of the ejection casing without impeding the transmission of movement forces as transmitted by each actuator to the flaps. This reduces the static indeterminacy of the flap control device.

The present invention also provides an aeroengine including an afterbody fitted with a variable section nozzle of the invention.

The invention also provides an aircraft having at least one engine of the invention.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
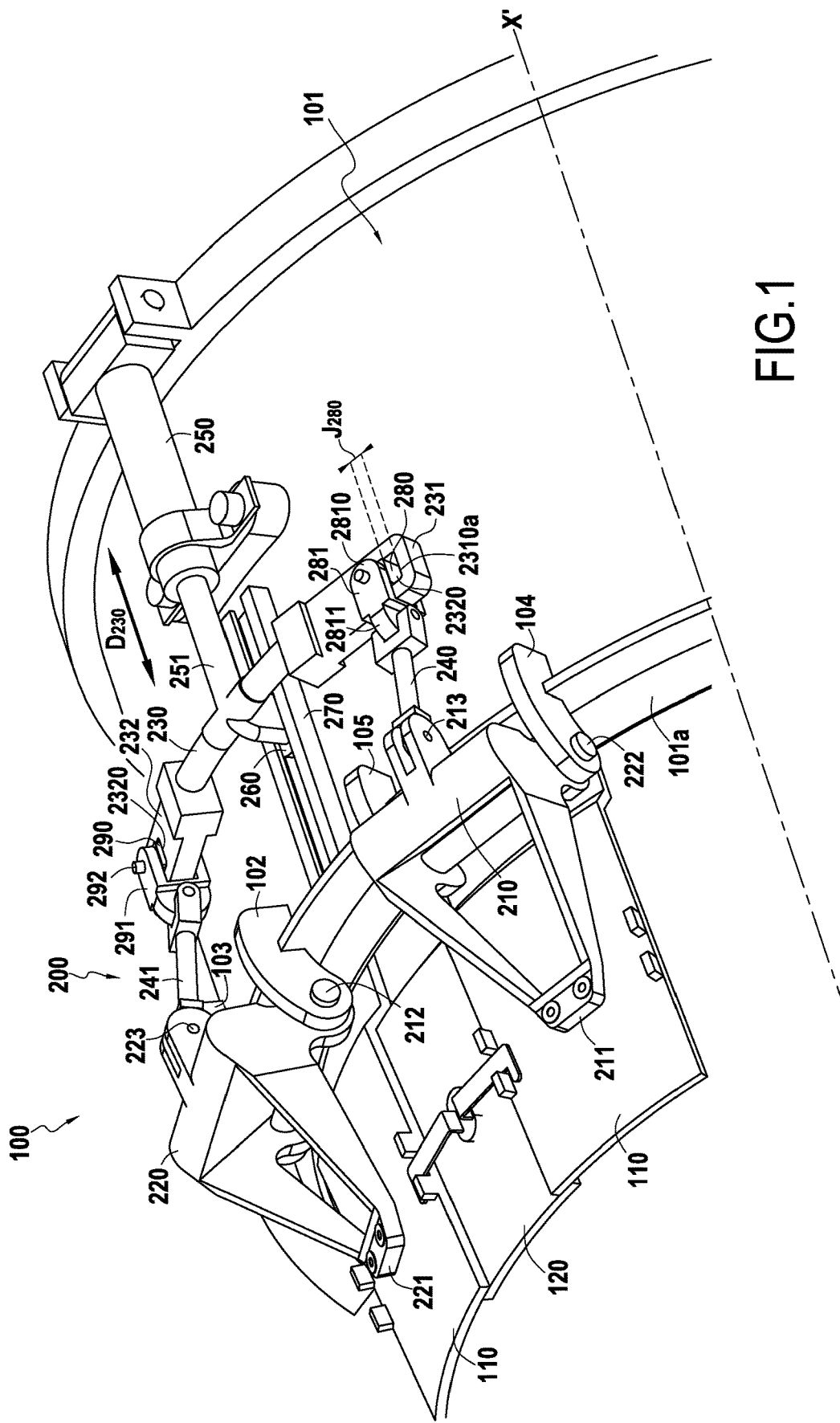
FIGS. 1 and 2 are fragmentary perspective views showing a variable section nozzle in accordance with an embodiment of the invention.
Figure 2:
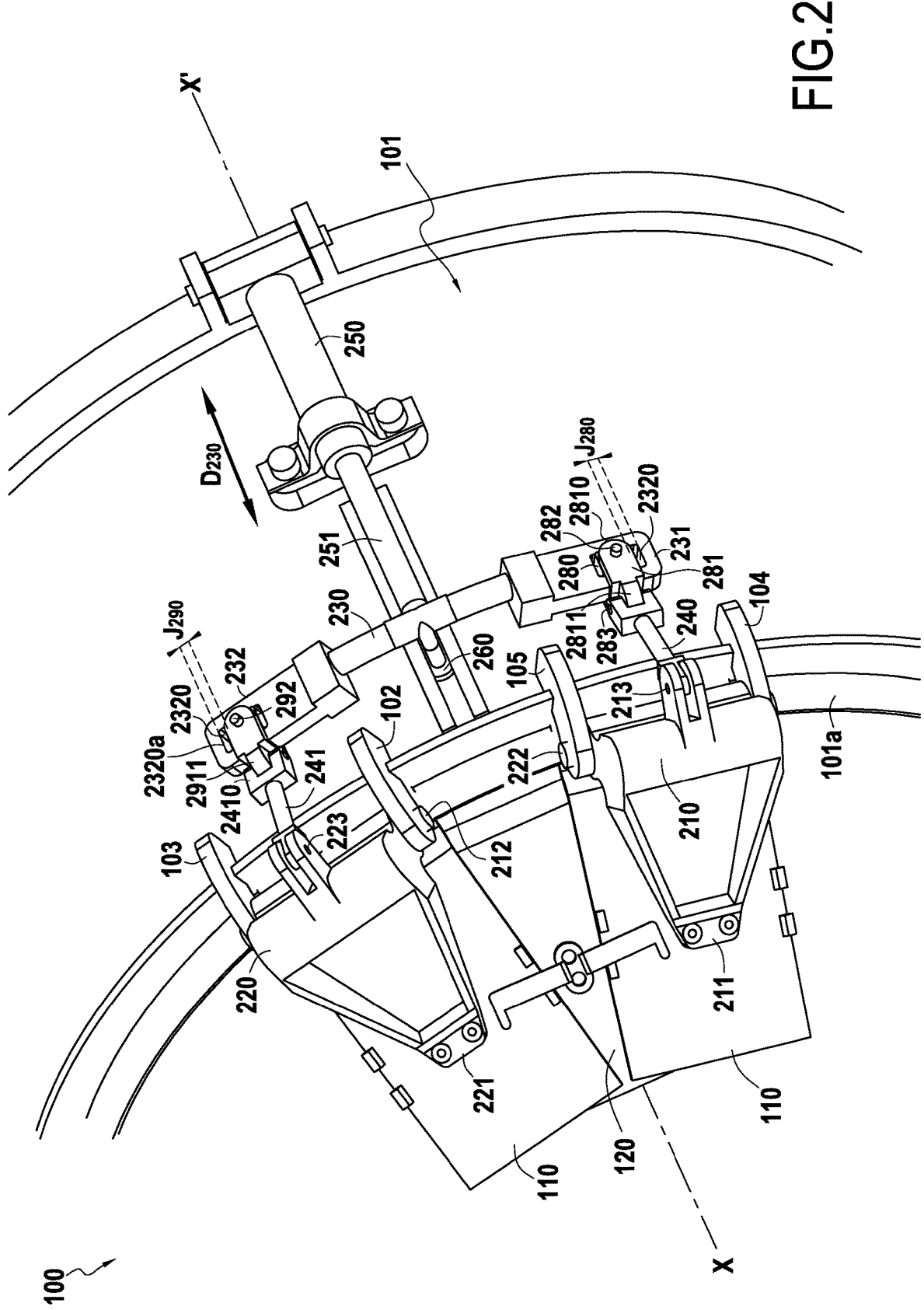
Figure 3:
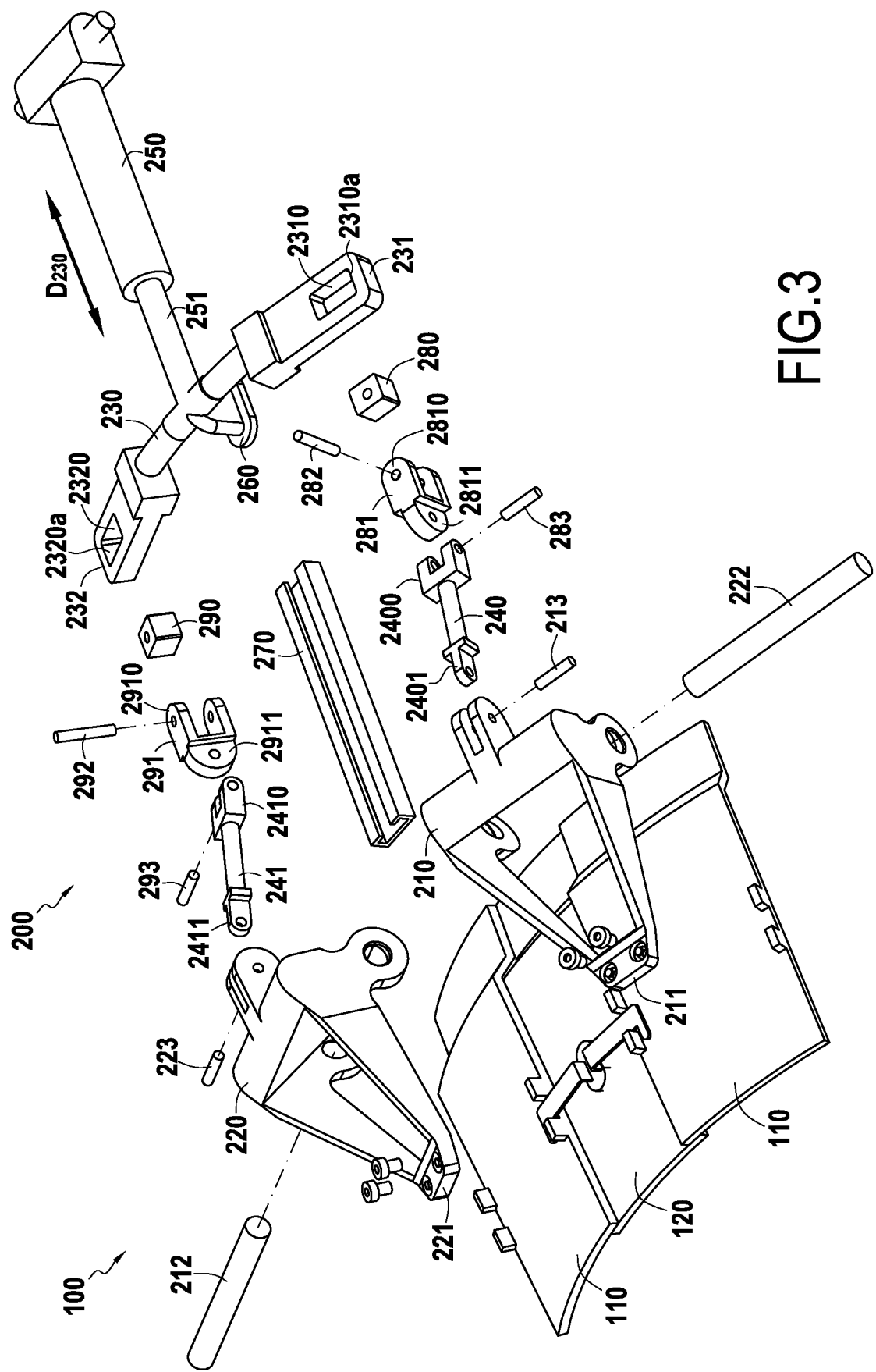
FIG. 3 is an exploded perspective view of the variable section nozzle of FIGS. 1 and 2.

FIGS. 1 to 3 show a variable section nozzle 100 in an embodiment of the invention. The nozzle 100 comprises a series of internal movable flaps or "hot" flaps 110, and a control device 200 connected to two adjacent internal flaps 110, with the control device 200 being fastened on the ejection casing 101 of the nozzle 100. A sealing plate 120 is fastened between the internal flaps. Since FIGS. 1 and 2 are fragmentary views of the nozzle 100, only two adjacent internal flaps 110 and one control device 200 are shown in these figures. Naturally, the nozzle is made up of a ring of internal flaps 110 with a plurality of control devices 200 distributed in annular manner around the outside wall of the ejection casing 101.

Each internal flap 110 is connected to the ejection casing 101 by a movable lever 210 or 220 of the control device 200, each lever being pivotally mounted to the downstream end 101a of the ejection casing 101. Each internal flap 110 is movable between a first position in which the flaps are in a high position (FIG. 1) and a second position in which the flaps are in a folded-down position (FIG. 2). More precisely, each control device 200 has two movable levers 210 and 220 with their free ends 211 and 221 fastened respectively to two adjacent internal flaps 110. The lever 210 is movable about a pin 212 that is fastened to the ejection casing via arms 102 and 103. Likewise, the lever 220 is movable about a pin 222 that is fastened to the ejection casing via arms 104 and 105. Other systems that enable the levers 210 and 220 to pivot could be envisaged.

The control device 200 also has a rigid movement transmission part 230 connected to two adjacent movable levers 210 and 220 respectively via a first connecting rod 240 and via a second connecting rod 241. The rigid movement transmission part 230 is also connected in its central portion to a rod 251 of a control actuator 250 fastened on the ejection casing upstream from the levers 210 and 220. Each rigid movement transmission part 230 is suitable for moving both ways along a direction D230 corresponding to the axial direction of the nozzle under the action of the control actuator 250 to which it is connected so as to move the adjacent levers 210 and 220 between the first and second positions of the internal flaps 110 (FIGS. 1 and 2).

In the presently-described example, each rigid movement transmission part 230 is connected to a guide carriage 260 slidably mounted in a slideway 270 fastened on the ejection casing 101 upstream from the levers 210 and 220 in the direction $D_{230}$ corresponding to the axial direction of the nozzle. The slideway 270 is in axial alignment with the control actuator 250.

As shown in particular in FIG. 3, the rigid movement transmission part 230 has first and second ends 231 and 232, each including a respective recess 2310 or 2320. A first hinge block 280 is received in the recess 2310 at the first end 231, the block 280 being connected to a first connection clevis 281. The connection clevis 281 is mounted at a first end 2810 so as to pivot on the block 280 via a pin 282 that extends in a direction that is radial relative to the axis XX' of the nozzle 100. The first connection clevis 281 is also connected at its second end 2811 to a first end 2400 of the first connecting rod 240 so as to pivot about a pin 283 that extends in the circumferential direction of the nozzle. The first hinge block 280 and the first connection clevis 281 thus form a first hinged connection between the first end 231 of the rigid movement transmission part 230 and the first connecting rod 240. Likewise, a second hinge block 290 is received in the recess 2320 at the second end 232, the block 290 being connected to a second connection clevis 291. The connection clevis 291 is pivotally mounted at a first end 2910 to the block 290 via a pin 292 that extends in a direction that is radial relative to the axis XX' of the nozzle 100. The second connection clevis 291 is also pivotally connected at its second end 2911 to the first end 2410 of the second connecting rod 241 by means of a pin 293 that extends in the circumferential direction of the nozzle. The second hinge block 290 and the second connection clevis 291 thus form a second hinged connection between the second end 232 of the rigid movement transmission part 230 and the second connecting rod 241.

Circumferential clearance $J_{280}$ (FIG. 1) is present between the first hinge block 280 and the edge 2310a of the recess 2310 that is on the outside in the circumferential direction of the nozzle 100, and circumferential clearance $J_{290}$ (FIG. 2) is present between the second hinge block 290 and the edge 2320a of the recess 2320 that is on the outside in the circumferential direction of the nozzle 100.

The second end 2401 of the first connecting rod 240 is pivotally connected to the first movable lever 210 by a pin 213 that extends in the circumferential direction of the nozzle 100, while the second end 2411 of the second connecting rod 241 is pivotally connected to the second movable lever 220 by a pin 223 that extends in the circumferential direction of the nozzle 100.

Thus, a movement of the rod 251 of the control actuator 250 towards the end 110a of the ejection casing 110 (along the bothway direction D230) causes the movable levers 210 and 220 to pivot about their respective pivot pins 212 and 222 towards the inside of the ejection casing. Since the free ends 211 and 221 of the levers 210 and 220 are fastened respectively to two adjacent internal flaps 110, the internal flaps 110 are lowered towards the second position in which the flaps are in a folded-in position (FIG. 2).

Likewise, a movement of the rod 251 of the control actuator 250 away from the end 110a of the ejection casing 110 (bothway direction D230) causes the movable levers 210 and 220 to pivot about their respective pivot pins 212 and 222 towards the outside of the ejection casing. Since the free ends 211 and 221 of the levers 210 and 220 are fastened respectively to two adjacent internal flaps 110, the internal flaps 110 are then raised towards the first position in which the flaps are in the high position (FIG. 1).

Figure 4:
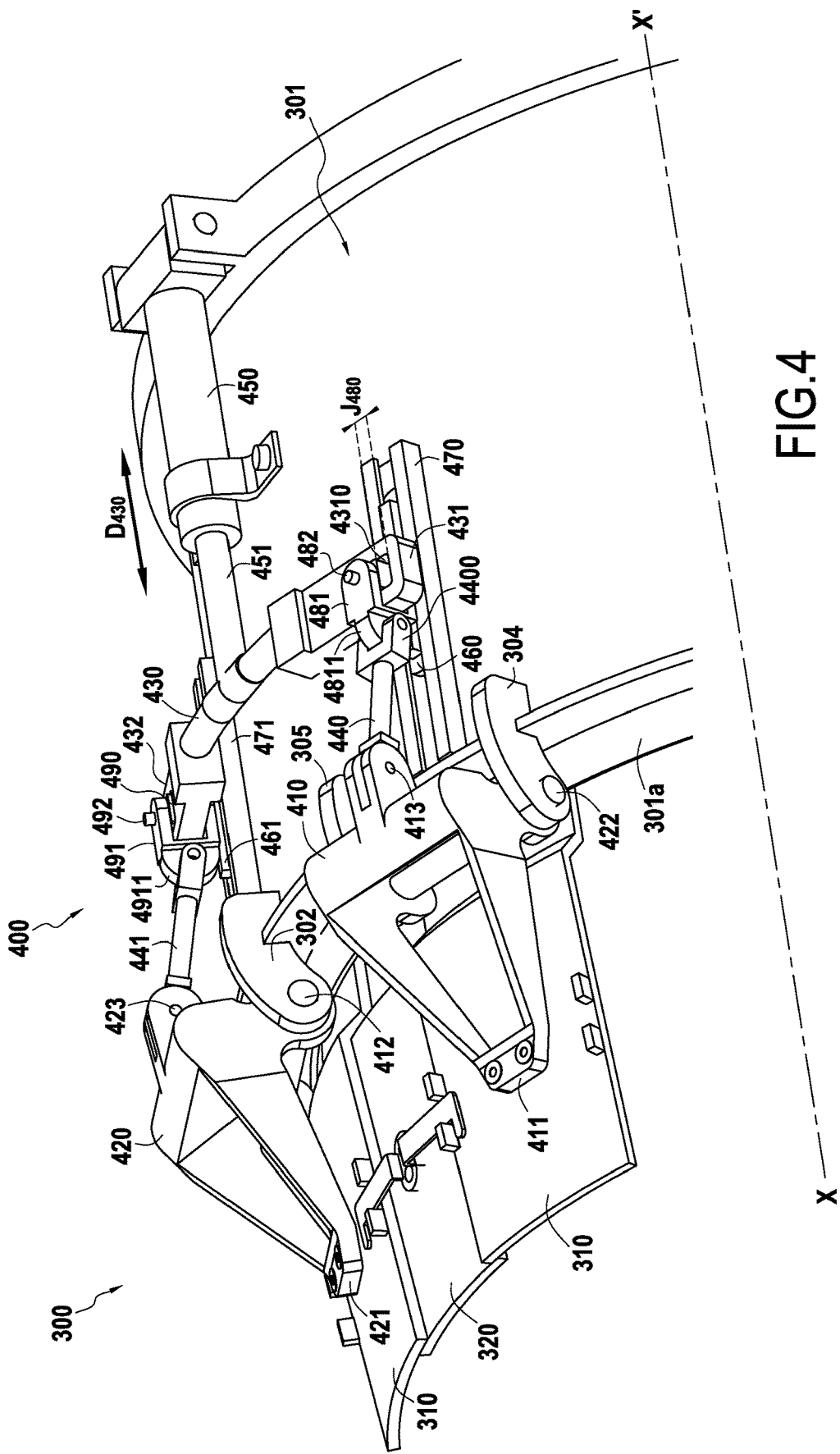
FIGS. 4 and 5 are fragmentary perspective views showing a variable section nozzle in accordance with another embodiment of the invention.
Figure 5:
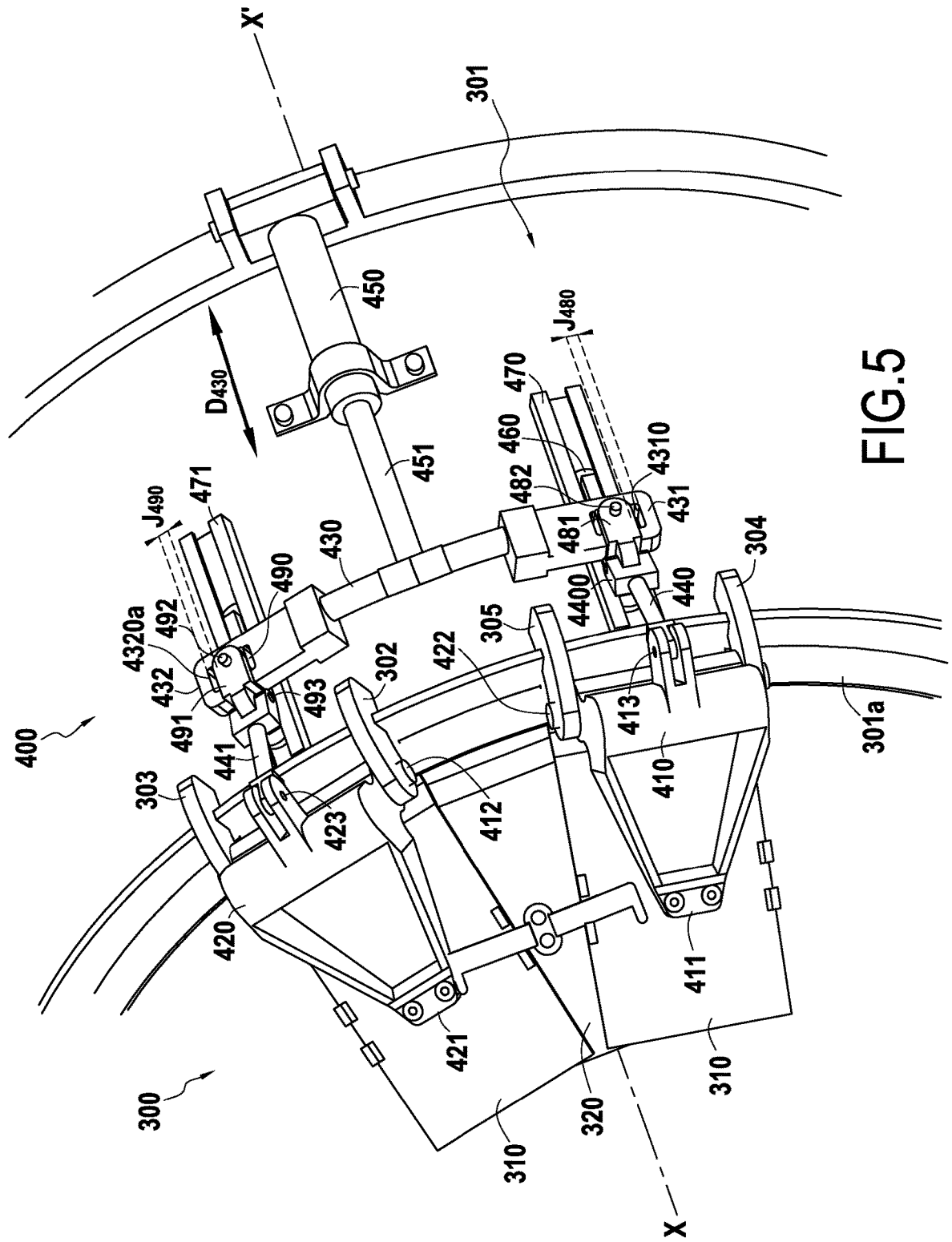
Figure 6:
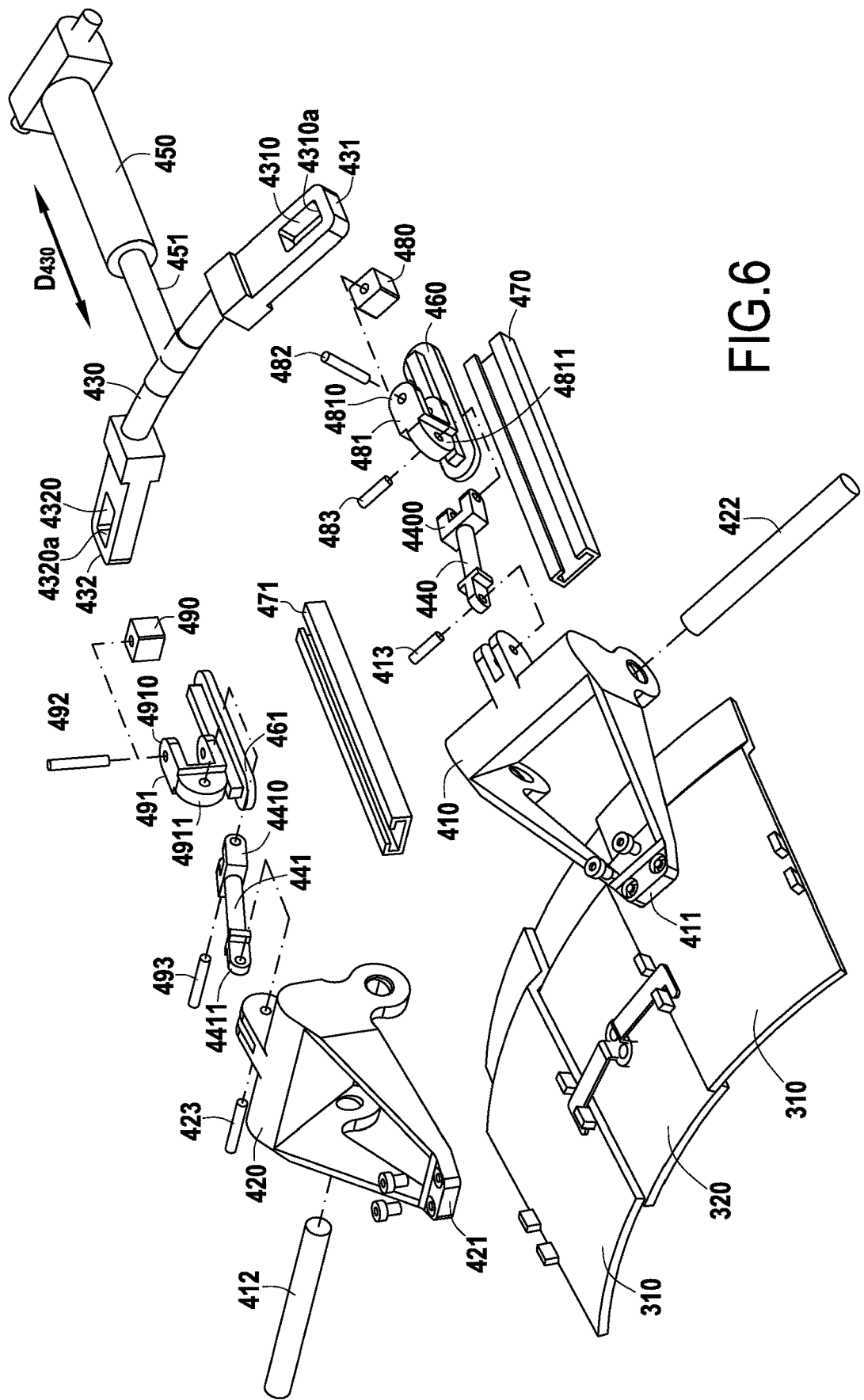
FIG. 6 is an exploded perspective view of the variable section nozzle of FIGS. 3 and 4.

FIGS. 4 to 6 show a variable section nozzle 300 in another embodiment of the invention that differs from the above described nozzle 100 in that each control device has two guide carriages, each slidably mounted in a respective slideway.

More precisely, the nozzle 300 comprises a series of internal movable flaps or "hot" flaps 310, and a control device 400 connected to two adjacent internal flaps 310, with the control device 400 being fastened on the ejection casing 301 of the nozzle 300. A sealing plate 320 is fastened between the internal flaps. Since FIGS. 4 and 5 are fragmentary views of the nozzle 300, only two adjacent internal flaps 310 and one control device 400 are shown in the figures. Naturally, the nozzle is made up of a ring of internal flaps 310 with a plurality of control devices 400 distributed in annular manner on the outside wall of the ejection casing 301.

Each internal flap 310 is connected to the ejection casing 301 by a movable lever 410 or 420 of the control device 400, each lever being pivotally mounted to the downstream end 301a of the ejection casing 301. Each internal flap 310 is movable between a first position in which the flaps are in a high position (FIG. 4) and a second position in which the flaps are in a folded-down position (FIG. 5). More precisely, each control device 400 has two movable leavers 410 and 420 with their free ends 411 and 421 fastened respectively to two adjacent internal flaps 310. The lever 410 is movable about a pin 412 that is fastened to the ejection casing via arms 302 and 303. Likewise, The lever 420 is movable about a pin 422 that is fastened to the ejection casing via arms 304 and 305. Other systems that enable the levers 310 and 320 to pivot could be envisaged.

The control device 400 also has a rigid movement transmission part 430 connected to the two adjacent movable leavers 410 and 420 respectively via a first connecting rod 440 and via a second connecting rod 441. The rigid movement transmission part 430 is also connected in its central portion to a rod 451 of a control actuator 450 fastened on the ejection casing upstream from the levers 410 and 420. Each rigid movement transmission part 430 is suitable for moving both ways along a direction D430 corresponding to the axial direction of the nozzle under the action of the control actuator 450 to which it is connected so as to move the adjacent leavers 410 and 420 between the first and second positions of the internal flaps 310 (FIGS. 4 and 5).

As shown in particular in FIG. 6, the rigid movement transmission part 430 has first and second ends 431 and 432, each including a respective recess 4310 or 4320. A first hinge block 480 is received in the recess 4310 at the first end 431, the block 480 being connected to a first connection clevis 481. The connection clevis 481 is mounted at a first end 4810 so as to pivot on the block 480 via a pin 482 that extends in a direction that is radial relative to the axis XX' of the nozzle 300. The first connection clevis 481 is also connected at its second end 4811 to a first end 4400 of the first connecting rod 440 so as to pivot about a pin 483 that extends in the circumferential direction of the nozzle. The first hinge block 480 and the first connection clevis 481 thus form a first hinged connection between the first end 431 of the rigid movement transmission part 430 and the first connecting rod 440.

In the presently described example, the first connection clevis 481 comprises a guide carriage 460 slidably mounted in a first slideway 470 fastened on the ejection casing 301 upstream from the first lever 410 in the direction D430 corresponding to the axial direction of the nozzle. The first slideway 470 is in axial alignment with the first connecting rod 440.

Likewise, a second hinge block 490 is received in the recess 4320 in the first end 432, the block 490 being connected to a second connection clevis 491. At a first end 4910, the connection clevis 491 is pivotally mounted to the block 490 via a pin 492 that extends in a radial direction relative to the axis XX' of the nozzle 300. At its second end 4911, the second connection clevis 491 is connected to the first end 4410 of the second connecting rod 441 so as to pivot about a pin 493 that extends in the circumferential direction of the nozzle. The second hinge block 490 and the second connection clevis 491 thus form a second hinged connection between the second end 432 of the rigid movement transmission part 430 and the second connecting rod 441.

In the presently described example, the second connection clevis 491 comprises a guide carriage 461 slidably mounted in a second slideway 471 fastened on the ejection casing 301 upstream from the second lever 410 in the direction D430 corresponding to the axial direction of the nozzle. The second slideway 471 is in axial alignment with the second connecting rod 440.

Circumferential clearance $J_{480}$ is present between the first hinge block 480 and the edge 4310a of the recess 4310 that is on the outside in the circumferential direction of the nozzle 300, and circumferential clearance $J_{490}$ is present between the second hinge block 490 and the edge 4320a of the recess 4320 that is on the outside in the circumferential direction of the nozzle 300.

The second end 4401 of the first connecting rod 440 is pivotally connected to the first movable lever 410 by a pin 413 that extends in the circumferential direction of the nozzle 300, while the second end 4411 of the second connecting rod 441 is pivotally connected to the second movable lever 420 by a pin 423 that extends in the circumferential direction of the nozzle 300.

Thus, a movement of the rod 451 of the control actuator 450 towards the end 310a of the ejection casing 310 (along the bothway direction D430) causes the movable levers 410 and 440 to pivot about their respective pivot pins 412 and 422 towards the inside of the ejection casing. Since the free ends 411 and 421 of the levers 410 and 420 are fastened respectively to two adjacent internal flaps 310, the internal flaps 310 are then lowered towards the second position in which the flaps are in a folded-down position (FIG. 5).

Likewise, a movement of the rod 451 of the control actuator 450 away from the end 310a of the ejection casing 310 (bothway direction D430) causes the movable levers 410 and 420 to pivot about their respective pivot pins 412 and 422 towards the outside of the ejection casing. Since the free ends 411 and 421 of the levers 410 and 420 are respectively fastened to two adjacent internal flaps 310, the internal flaps 310 are then raised towards the second position in which the flaps are in the high position (FIG. 4).

The invention claimed is:

1. A variable section nozzle comprising:
   an ejection casing and a plurality of internal flaps arranged in a ring downstream from the ejection casing, each internal flap being connected to the ejection casing by a movable lever pivotally mounted to a downstream end of the ejection casing, each lever being movable between a first position in which the internal flaps are in a high position and a second position in which the internal flaps are in a folded-down position; and
   a plurality of rigid movement transmission parts distributed circumferentially around the ejection casing, each rigid movement transmission part being connected respectively to two adjacent levers by first and second connecting rods, each rigid movement transmission part also being connected to a control actuator, each rigid movement transmission part being suitable for moving in a direction corresponding to an axial direction of the nozzle under action of the control actuator to which the rigid movement transmission part is connected in such a manner as to move the adjacent levers between the first and second positions,
   wherein each rigid movement transmission part is connected to a guide carriage slidably mounted in a respective slideway, each slideway being fastened on the ejection casing upstream from the levers in a direction corresponding to the axial direction of the nozzle, each slideway being in axial alignment with the control actuator, or wherein each rigid movement transmission part is connected to two guide carriages each slidably mounted in a respective slideway, each slideway being fastened on the ejection casing upstream from each lever in a direction corresponding to the axial direction of the nozzle, the slideways being offset in the circumferential direction relative to each control actuator, and wherein a mounting position of the lever to the election casing is further downstream than a pivotal connection position between the lever and an end of the connecting rod.

2. The variable section nozzle according to claim 1, wherein each rigid movement transmission part is connected to the first and second connecting rods by respective first and second hinged connections.

3. The variable section nozzle according to claim 2, wherein the first hinged connection comprises a first hinge block received in a recess present at a first end of the rigid movement transmission part, a first clevis connecting the first hinge block to the first connecting rod, circumferential clearance being present between the first hinge block and an edge of the recess that is on the outside in a circumferential direction of the variable section nozzle, and wherein the second hinged connection comprises a second hinge block received in a recess present at a second end of the rigid movement transmission part, a second clevis connecting the second hinge block to the second connecting rod, circumferential clearance being present between the second hinge block and an edge of the recess that is on the outside in the circumferential direction of the variable section nozzle.

4. An aeroengine including an afterbody fitted with a variable section nozzle according to claim 1.

5. An aircraft including at least one aeroengine according to claim 4.

6. The variable section nozzle according to claim 1, wherein a sealing plate is fastened to a pair of internal flaps associated with the two adjacent levers that are moved by a respective rigid movement transmission part.

* * * * *